US007019261B2

(12) United States Patent
Worrell et al.

(10) Patent No.: US 7,019,261 B2
(45) Date of Patent: Mar. 28, 2006

(54) APPARATUS AND METHOD FOR A STEERING WHEEL WITH A PREFORMED HEATING ELEMENT

(75) Inventors: Barry C. Worrell, Dayton, OH (US); Duane D. Williams, Beavercreek, OH (US); Ronald H. Haag, Clarkston, MI (US)

(73) Assignee: Delphi Technologies, Inc., Troy, MI (US)

(*) Notice: Subject to any disclaimer, the term of this patent is extended or adjusted under 35 U.S.C. 154(b) by 230 days.

(21) Appl. No.: 10/360,574

(22) Filed: Feb. 6, 2003

(65) Prior Publication Data

US 2004/0155020 A1 Aug. 12, 2004

(51) Int. Cl.
*B60L 1/02* (2006.01)

(52) U.S. Cl. ........................ 219/204; 219/543; 219/544

(58) Field of Classification Search ................. 219/204, 219/202, 206, 209, 528, 529, 549, 543–545, 219/535, 546, 547, 548, 494
See application file for complete search history.

(56) References Cited

U.S. PATENT DOCUMENTS

| | | | | |
|---|---|---|---|---|
| 2,835,777 | A | | 5/1958 | Gates et al. |
| 3,349,722 | A | | 10/1967 | Davis |
| 3,851,150 | A | | 11/1974 | Von Holzen |
| 4,547,655 | A | | 10/1985 | Kurata et al. |
| 4,631,976 | A | | 12/1986 | Noda et al. |
| 4,707,396 | A | | 11/1987 | Wank et al. |
| 5,408,069 | A | | 4/1995 | Mischel, Jr. |
| 5,605,643 | A | * | 2/1997 | Reece ........................ 219/204 |
| 6,093,910 | A | | 7/2000 | McClintock et al. |
| 6,194,692 | B1 | | 2/2001 | Oberle |
| 6,326,593 | B1 | * | 12/2001 | Bonn et al. ................. 219/204 |
| 6,392,195 | B1 | | 5/2002 | Zhao et al. |
| 6,441,344 | B1 | | 8/2002 | Bonn et al. |
| 6,512,202 | B1 | | 1/2003 | Haag et al. |
| 6,524,515 | B1 | * | 2/2003 | Cavalli ....................... 264/449 |
| 6,707,006 | B1 | | 3/2004 | Myers |
| 6,740,856 | B1 | * | 5/2004 | Haag .......................... 219/543 |
| 2001/0000336 | A1 | | 4/2001 | Abbott et al. |
| 2002/0008097 | A1 | | 1/2002 | Hobby |
| 2002/0096512 | A1 | | 7/2002 | Abbott et al. |

FOREIGN PATENT DOCUMENTS

DE 297 12 839 U1 10/1997

OTHER PUBLICATIONS

Document entitled: “Product Applications Makrofol® Polycarbonate and Bayfol® Polycarbonate Blend Films”, 3 pp.
Makrofol® Bayfol® Application Technology Information document entitled “In–Mould Decoration”, dated Sep. 1999, 8 pp.
Makrofol® Bayfol® Application Technology Information document entitled “New applications and pratical examples involving in–mould decoration”, dated Sep. 30, 1997, 20 pp.
Co–pending application entitled “Preformed Heating Element and Method of Making”, filed contemporaneously.

* cited by examiner

*Primary Examiner*—Robin O. Evans
*Assistant Examiner*—Vinod Patel
(74) *Attorney, Agent, or Firm*—Scott A. McBain

(57) ABSTRACT

A heated steering wheel with a preformed heating member, having an inner rim portion; a cushion layer disposed about the inner rim portion; and a preformed heating element disposed about the cushion layer; wherein the cushion layer is applied using a molding process and the preformed heating element and the inner rim portion are inserted in a mold used for the molding process prior to the application of said cushion layer therein.

13 Claims, 10 Drawing Sheets

APPARATUS AND METHOD FOR A STEERING WHEEL WITH A PREFORMED HEATING ELEMENT

CROSS REFERENCE TO RELATED APPLICATION

The present application is related to commonly owned and assigned U.S. patent application entitled: "Preformed Heating Element and Method of Making", Ser. No. 10/360,589 issued as U.S. Pat. No. 6,740,856, filed contemporaneously with this application the contents of which are incorporated herein by reference thereto.

TECHNICAL FIELD

The present disclosure relates to a heated steering wheel for a vehicle, and more particularly, to a method for securing a preformed heating element to a steering wheel.

BACKGROUND

A number of attempts have been made to provide a steering wheel with a heater element to alleviate the uncomfortable touching of the steering wheel by a driver during cold weather.

The usual approach has involved the use of a length of resistance wire as heating elements, which are embedded within the steering wheel or which extend within a hollow steering wheel. An electrical current is then arranged to pass through the resistance wire.

However, such prior art arrangements have not been very successful due to various factors. For example, these prior art arrangements are complex and require major structural modifications of the steering wheel, which unduly adds to the cost of manufacture. A further difficulty includes the method of assembling such heating elements due to the complex three-dimensional shape of modern steering wheels, and the poor elongation characteristics of the heating element. As these previous approaches involved the use of a length of resistance wire as the heating element, either embedded within the steering wheel, within a protective sheath, and/or extending within a hollow steering wheel the inherent complexity required in applying the heating element, along with the major structural modifications required to the steering wheel itself, adds to the cost of manufacture making the use of such an arrangement undesirable.

Assembling a heating steering wheel can be labor intensive due to the complex three-dimensional shape of modern steering wheels and the poor elongation characteristics of heating elements. In addition, imperfections in the outer surface of the steering wheel can add to the labor issues and cost of assembling a heated steering wheel. For example, the so-called parting line a by product of the manufacturing process of the steering wheel core provides a protrusion that must be accounted for.

SUMMARY

Therefore, it is an object of the present disclosure to create a simplified method for attaching or adhering a preformed heating element to a steering wheel.

A heated steering wheel with a preformed heating member, having an inner rim portion; a cushion layer disposed about the inner rim portion; and a preformed heating element disposed about the cushion layer; wherein the cushion layer is applied using a molding process and the preformed heating element and the inner rim portion are inserted in a mold used for the molding process prior to the application of said cushion layer therein.

The above-described and other features and advantages of the present invention will be appreciated and understood by those skilled in the art from the following detailed description, drawings, and appended claims.

DETAILED DESCRIPTION

Figure 1:
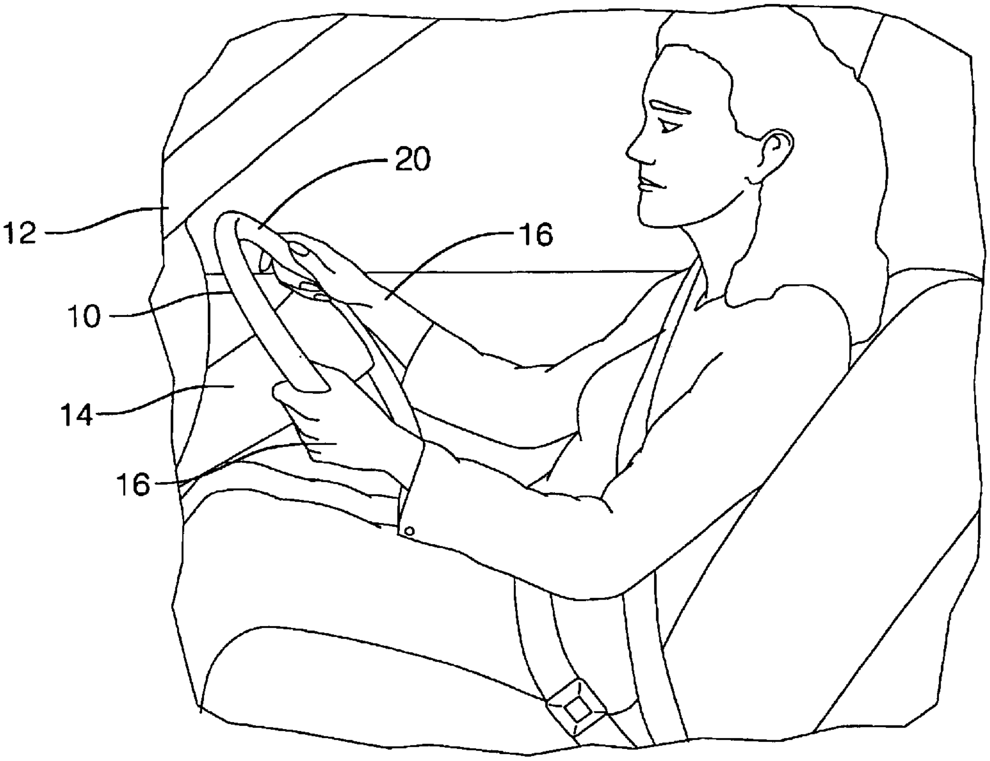
FIG. 1 is an illustration of a vehicle operator manipulating a steering wheel.

Referring now to FIG. 1, one embodiment of a heated steering wheel 10 is illustrated in an operational configuration inside a partially shown automobile vehicle, generally designated at 12. Heated steering wheel 10 is operably connected to a steering mechanism 14. Heated steering wheel 10 is gripped by an operator's hand 16 to guide the vehicle 12 in a desired direction. Advantageously, heated steering wheel 10 warms up the operator's hands 16 when the ambient temperature is cool, causing the steering wheel insert and covering to remain cool even after the vehicle is warmed up. In particular, a steering wheel covered with leather will remain cool after the vehicle's heating system has been turned on.

Heated steering wheel 10 allows the driver to grip the wheel in comfort without gloves, even on the coldest winter days. However, constant gripping of the steering wheel by the operator may damage the wires or heating element on the steering wheel. Thus, by encapsulating or enclosing the otherwise fragile heating element within a preformed element, the damaging problem is alleviated. In addition, the manufacturing process of such a steering wheel is simplified and a uniform exterior surface is provided.

Figure 2:
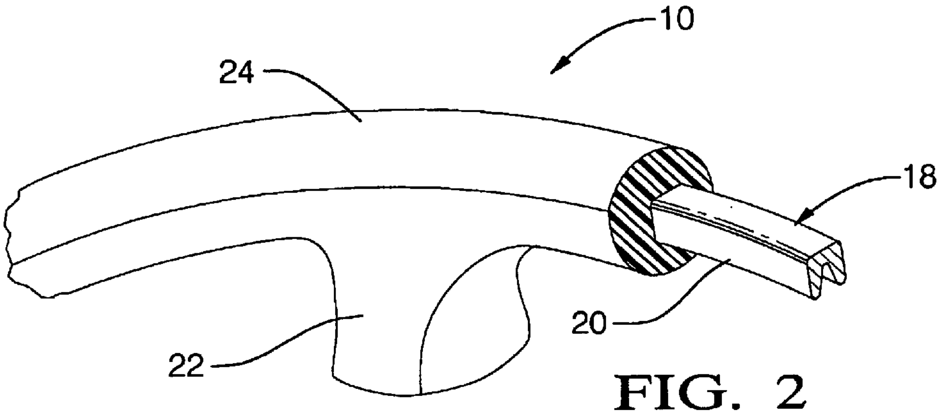
FIG. 2 is a partial perspective view of a portion of a steering wheel insert without an external covering or preformed heating element.
Figure 3:
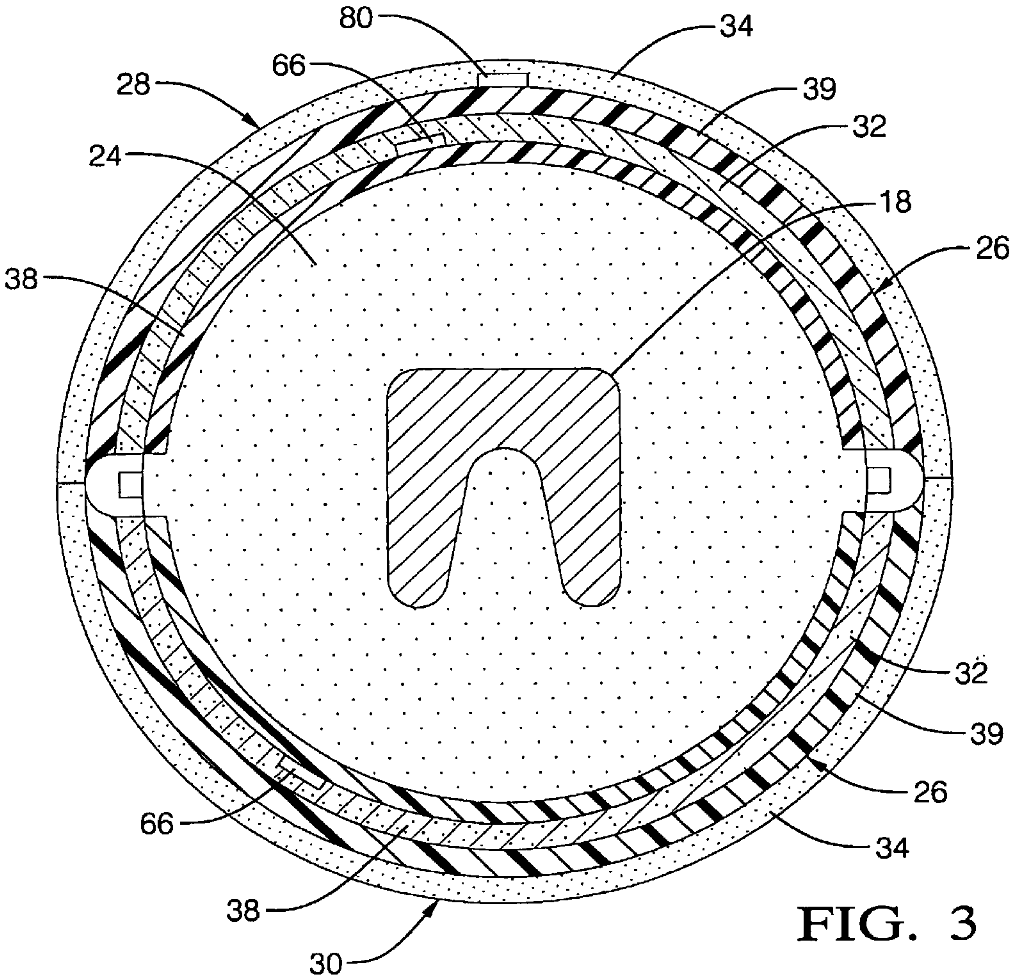
FIG. 3 is a cross-sectional view of a steering wheel insert having a preformed heating element applied thereto in accordance with the present disclosure.

Referring now to FIGS. 2 and 3, heated steering wheel 10 includes a frame portion 18 that defines the general shape and configuration of heated steering wheel 10. Preferably, frame portion 18 is made from a metal material such as magnesium. Frame portion 18 includes an inner rim or hub (not shown), an outer rim 20 circumscribing the hub, and at least a spoke 22 interconnecting the hub with outer rim 20. The hub, outer rim 20, and at least one spoke 22 comprise an integral and one-piece frame portion or steering wheel insert for heated steering wheel 10.

Heated steering wheel 10 also includes a cushion member 24 that encloses frame portion 18, preferably around outer rim 20 and over spokes 22. Cushion member 24 cushions frame portion 18 to enhance the comfort of heated steering wheel 10 for the operator's hands 16. Cushion member 24 is preferably made of a cushioning material such as polyurethane, which can be easily molded to conform to the shape of frame portion 18. In accordance with an exemplary embodiment of the present disclosure cushion member 24 is applied to the frame portion by an injection molding process wherein a cushion layer is disposed about frame portion 18.

Heated steering wheel 10 also includes a preformed heating element 26. Preformed heating element 26 is formed in accordance with the methods disclosed in commonly owned and assigned United States patent application filed contemporaneously herewith and entitled "Preformed Heating Element and Method of Making", Ser. No. 10/360,589 issued as U.S. Pat. No. 6,740,856. In accordance with an exemplary embodiment preformed heated element comprises at least two portions an upper or first half 28 and a lower or second half 30 which are located about cushion member 24 in order to provide heat to an exterior decorative surface which is either integral with the preformed heating element or is applied to an exterior surface of the preformed heating element.

Referring now to FIGS. 4–13 and as disclosed in copending U.S. patent application, Ser. No. 10/360,589 issued as U.S. Pat. No. 6,740,856, preformed heating element 26 is molded to have an integral heating element or conductive layer disposed within preformed heating element 26. In an exemplary embodiment, preformed heating element 26 is formed by a manufacturing process the conductive layer 32 is sandwiched between two layers of material which when hardened and cured provide a protective shell or covering to the heating element and the hardened preformed heating element is easily manipulated in subsequent manufacturing steps prior to its application the desired steering wheel location. The preformed heating element is easily formed in a variety of configurations for numerous applications (e.g., steering wheels of various shapes and sizes).

In accordance with an exemplary embodiment of the present disclosure the preformed heating element comprises a first layer having a formable film, a conductive layer disposed on the formable film and being adapted to be electrically connected to a source of power, an encapsulating or outer layer disposed on the conductive layer, which may provide aesthetic qualities as well as encapsulating qualities and a second layer adhered to the first layer, the second layer providing structural characteristics to the preformed heating element.

The first layer is formed by a forming process such as vacuum forming wherein the formable film, the conductive layer and the encapsulation or outer layer are heated and vacuum formed to have a unique configuration corresponding to the vacuum forming mold. The unique configuration of the mold will provide a first layer and ultimately a preformed heating element that mates or corresponds to a unique configuration of an area to be heated, which in an exemplary embodiment is achieved by applying a current to the conductive layer of the preformed heating element.

After the first layer is formed, the portion of the first layer corresponding to the preformed heating element is then adhered to a second layer, which in an exemplary embodiment, is applied by an injection molding process. The second layer is adhered to the formable film layer at an opposite side of the conductive layer. The second layer is typically thicker than the first layer and provides structural rigidity to the first layer, as the first layer comprises formable materials and in an exemplary embodiment the outer layer is relatively thin thereby allowing the heat generated by the conductive layer to radiate outwardly in a preferred manner. However, the second layer may have the same thickness or less than that of the first layer as long as the required rigidity is provided.

Figure 4:
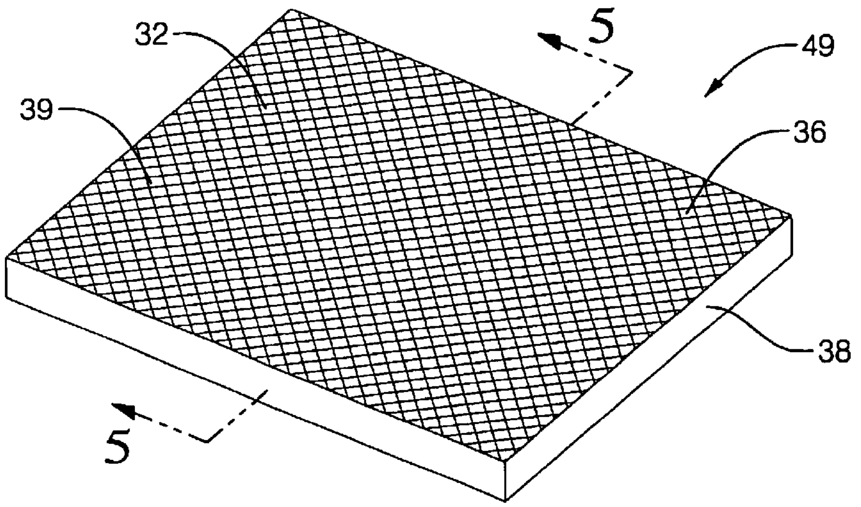
FIG. 4 is a perspective view of a sheet used to form a portion of the preformed heating element of FIG. 3.
Figure 5:
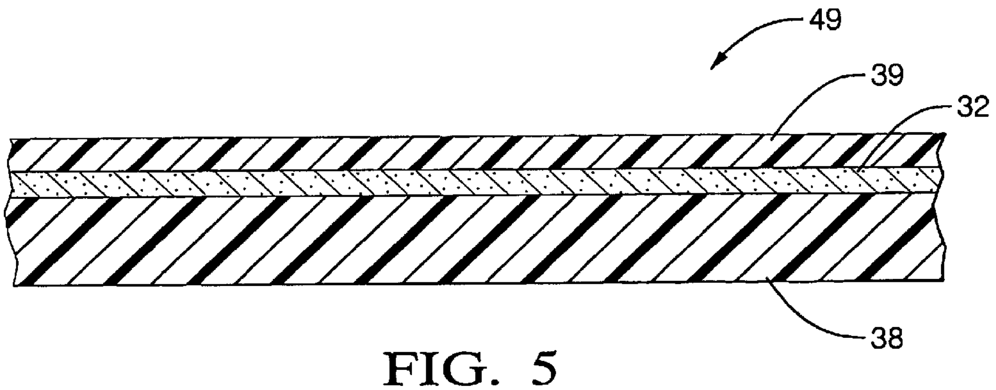
FIG. 5 is a view along lines 5—5 of FIG. 4.
Figure 6:
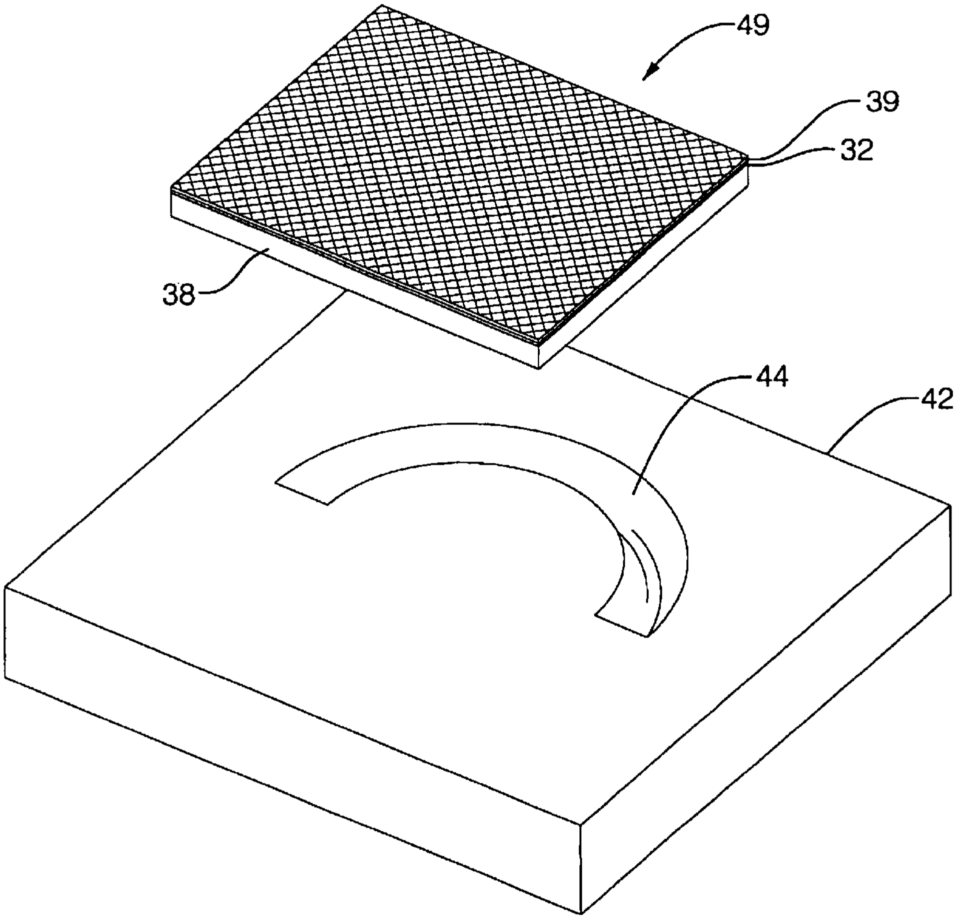
FIG. 6 is a perspective view of mold used to form the sheet illustrated in FIGS. 4 and 5.
Figure 7:
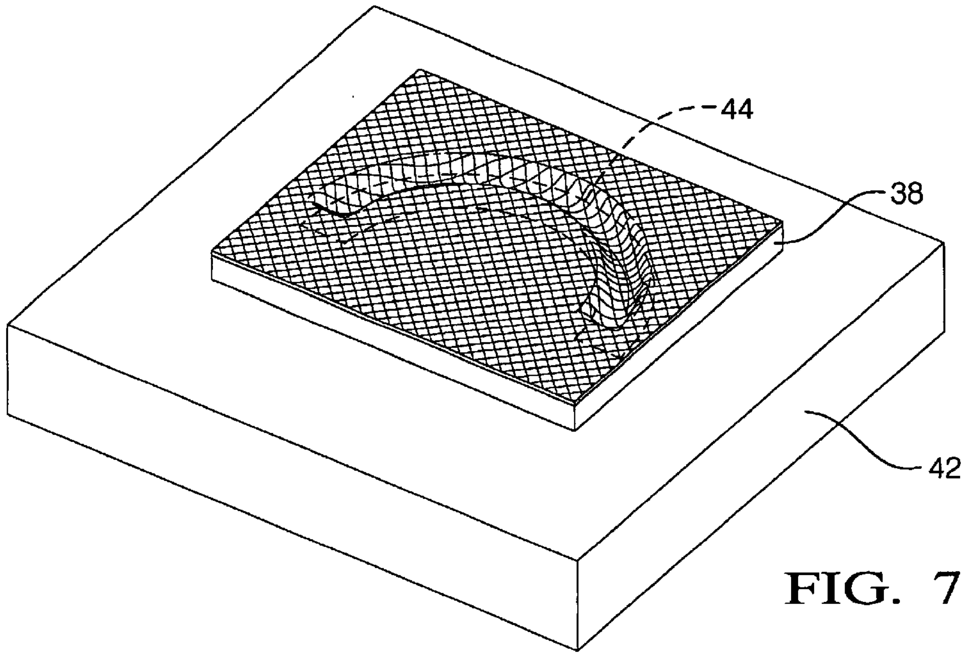
FIG. 7 is a perspective view of the forming process used to form the sheet illustrated in FIGS. 4 and 5.
Figure 8:
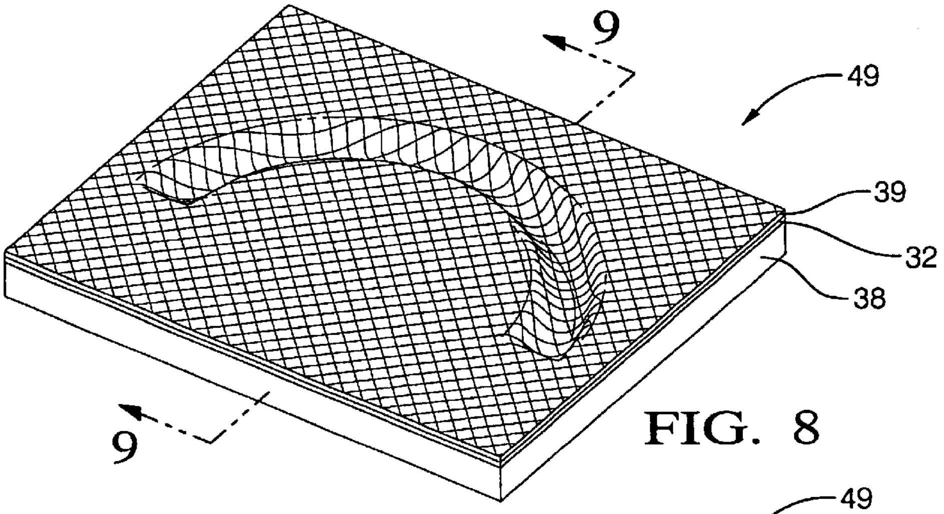
FIG. 8 is a perspective view of a sheet formed by the die of FIG. 6.

The pre-formed heating element comprises an electrically conductive layer 32 deposited directly on a first surface 36 of a portion of a material 38. Referring now to FIGS. 4 and 5 and in accordance with the present disclosure, material 38 is a sheet of specially designed formable film, which comprises the first surface and a portion of the first layer of the heating element.

In accordance with an exemplary embodiment the sheet of formable film is a Bayer Makrofol Polycarbonate or a Bayfol Polycarbonate blended film or equivalent thereof. Examples of such material and their properties are identified in the document entitled "Product Applications MAKROFOL Polycarbonate and BAYFOL Polycarbonate blend films" and identified in the Information Disclosure Citation filed with the present application, the contents of which are incorporated herein by reference thereto.

The electrically conductive layer is deposited on material 38 prior to its formation by the methods disclosed herein. In a preferred application process the electrically conductive layer is applied using a screening process wherein the conductive layer is screened onto the material 16 before or during the forming process of the first layer. The electrically conductive layer comprises an electrically conductive material, which may include metal, electrically conductive carbon including carbon and/or graphite particles, fibrils, fibers, micro-tubes, and a combination comprising at least one of the aforementioned materials. The preferred electrically conductive material for use herein is also thermally conductive. Other preferred materials for the electrically conductive layer comprise copper, silver, nickel, and alloys of any one of the foregoing materials.

In one embodiment, the electrically conductive layer is formed from a curable electrically conductive ink 32 comprising an electrically conductive material wherein the ink is deposited directly on the first surface of material 38.

The term "curable, cured, and curing" as used herein with regard to the electrically conductive ink, refers to any appropriate drying, reacting, crosslinking, solidification, evaporation of solvent, and the like required to convert the electrically conductive ink into a dry, preferably non-tacky state. These include air-drying, heat curing, curing through irradiation including, for example through exposure to UV light, and the like.

The formable film is screened with the specially formulated conducting inks 32 which comprise the electrically conductive layer. Preferably the electrically conductive material is dispersed in an ink as a finely divided particle, powder, and/or flake. More preferably, the electrically conductive material is dispersed within the ink to form an essentially uniform mixture, admixture and/or composition that is readily sprayed to form an essentially uniform layer on a substrate. The ink may also include a solvent, a drying retarding agent, a surfactant, a viscosity modifying agent, or a combination comprising at least one of the foregoing. Suitable solvents for use herein include both water and organic solvents. For example, a curable conductive ink comprising a silver and copper mixture such as Electrodag SP-405 type (commercially from Acheson Colloids Company, Port Huron, Mich., U.S.A.), or equivalents thereof are contemplated for use as the curable conductive ink. The conducting ink is applied across the entire surface of the formable film in order to create heating a heating element surface area, which will comprise the electrically conductive layer of the preformed heating element. As illustrated in FIG. 1, the configuration of the heating element surface area is an interlocking grid. Of course, the heating element surface area can have other configurations or may completely cover an entire surface of the formable film.

The initial value of resistance of the heating element will be considerably lower in the two-dimensional shape (prior to forming) than when it will be in its final three-dimensional shape (after forming). Therefore, it will be necessary to determine the resistance values and appropriate changes (e.g., from two to three dimensions) in order to determine the required resistance for each desired application, which depends ultimately on the final configuration of the preformed heating element. The resistance of the conductive layer is tested in accordance with known technologies such as applying a known current value and measuring the voltage drop across the area of the conductive ink being tested.

Thus, and in order to provide the appropriate amount of heat energy, the surface resistivity of the electrically conductive layer must be determined. Suitable levels of surface resistivity depend on the total surface area required, the amount of heat required, and the voltage applied to produce the heat. Also important in determining the surface resistivity is the thickness of the conductive layer. A non-uniform heat load may be applied to these, or other discrete positions of the preformed heating element such that varying the thickness of the conductive layer to form localized higher heating zones varies the resistivity local to those positions. These higher heating zones result from the increased power dissipated from the thinner areas as compared to the thicker areas, both of which are simultaneously provided with the same amount of current.

The method by which the conductive layer is applied to the surface of the steering wheel needs to be suitable to form a continuously conductive layer over the desired portion of the preformed heating member. Suitable methods of deposition include dipping, spray coating, gas assisted spray coating, electrospray coating, powder coating, screen printing, ink jet printing, electrostatic printing, or the application of a preprinted sheet of a conductive material and equivalents thereof.

Printing, spraying and other techniques capable of providing the layer of conductive material where needed, without masking, and with a minimal amount of over spray are contemplated for applying the conductive layer. Examples of suitable printing processes include gas (e.g., air) assisted spraying which directs the sprayed material onto the surface with minimal if any amount of waste.

The conductive layer may be a single layer of conductive material, or in the alternative may include a plurality of layers, at least one of which is electrically conductive. This plurality of layers may also include protection layers applied to provide resistance to wear and abrasion, protection from liquids, or a combination comprising the conductive layer applied to the formable film.

In accordance with an exemplary embodiment the ink is cured by running it through an oven at specified times and temperatures, which will depend on the thickness of the ink and the drying time specifications of the ink used. In addition, the film and the ink screened onto it may also affect the drying time and heat. Finally, the size of the part may also be a contributing factor to the amount of time (e.g., deformations in the formed part may lengthen or shorten the drying time and/or temperature).

After the conductive layer 32 is applied and cured another layer 39 is applied on top of conductive layer 32. In an exemplary embodiment layer 39 comprises a layer of decorative film or indicia which is applied on top of the conductive layer, the decorative layer 39 will correspond to the preferred usage and location of the pre-formed heating element having a unique configuration (e.g., an interior trim portion of a vehicle) or alternatively, an item for heating a mechanical component such as a vehicle engine wherein the indicia of layer 39 provides information to an individual such as an engineer or mechanic. Layer 39 in addition to providing indicia or a decorative appearance also encapsulates conductive layer 32 protecting it from damage. The thickness of layer 39 is sufficient enough to protect conductive layer 32, while allowing the heat generated by conductive layer 32 to radiate outwardly through layer 39.

In an exemplary embodiment formable sheet 38, conductive layer 32 and layer 39 form a first layer 41 and are all capable of being formed by a forming process in order to achieve the desired configuration of first layer 41 and ultimately the preformed heating element.

Referring now to FIGS. 4–12 and in accordance with an exemplary embodiment, sheet 38 having layer 32 and layer 39 deposited thereon is shaped by thermoforming (vacuum) or by a high-pressure forming process wherein the sheet with the conductive layer and layer 39 applied thereon is positioned over a forming tool 42 or die that has a cavity 44 corresponding to the desired shape of the first layer and at least a portion of the preformed heating element.

Alternatively, forming tool 42 may comprise a specific profile or protrusion wherein the sheet is vacuum formed around the protrusion of the tool. In yet another alternative, the tool may have both the protrusions and cavities to shape the sheet with the forming process.

As is known in the art, and if a vacuum forming process is used the sheet is subjected to heat and a vacuum or suction force is applied to mold the heated item around the configuration of the mold. Thus, when the vacuum forming or high pressure forming process is complete a portion of the sheet is formed to have the configuration of cavity 44 or the specific configuration of the tool. In accordance with an exemplary embodiment the forming tool is designed to create a part that will have an encapsulated heating element, which is sandwiched between layer 39 and formable film 38. The cycle times, temperatures, and vacuum or pressures are set up accordingly to create the proper characteristics of the element design itself. In accordance with an exemplary embodiment, the sheet is formed with a vacuum forming or high pressure forming process in accordance with known technologies.

The part or cavity is capable of defining a feature on first layer 49 to accommodate a protuberance on the item onto which the preformed heating element is to be located. Thus, sheet 38 with conductive layer 32 and layer 39 is capable of being formed into any shape, which is capable of being defined by the cavity of the die.

Figure 9A:
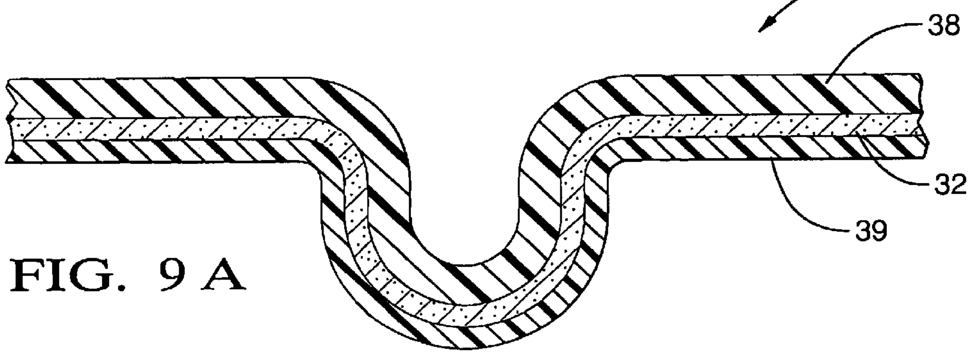
FIG. 9A is a cross-sectional view along lines 9—9 of FIG. 8.
Figure 9B:
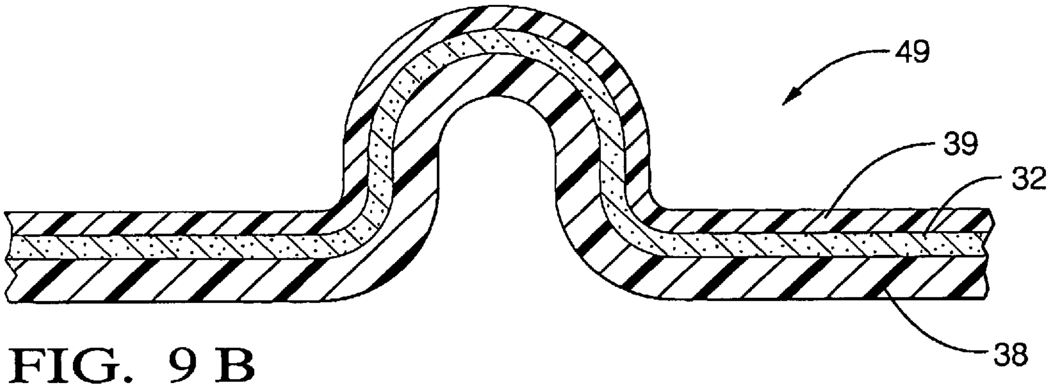
FIG. 9B is a cross-sectional view of an alternative configuration of FIG. 9A.

Once the forming process is complete the sheet is now formed with a part corresponding to the cavity of the forming tool. Is it noted that the layer of conductive ink can be positioned either facing into the cavity or out of the cavity. For example, FIGS. 9A and 9B illustrate cross sectional views of a part formed by the mold of FIG. 6 wherein the side of the formable film with the conductive layer and layer 39 deposited thereon is inserted into the cavity first (FIG. 9A) or last (FIG. 9B). Accordingly, the formed first layer is capable of being formed with the conductive layer closer to either portion of the first layer formed by the manipulation of the formable sheet, conductive layer 32 and layer 39.

It is noted that the dimensions, configurations and proportional relationships illustrated in the Figures of the present application are provided as examples and are not intended to be limiting. Therefore, it is contemplated that the dimensions, configurations and proportional relationships of the present disclosure may vary from those illustrated in the Figures.

In accordance with an exemplary embodiment the forming tool is designed to create a part either first half 28 or second half 30 that is half of a portion of the diameter of the steering wheel rim and the desired amount of cushion layer to be disposed therebetween so that the preformed heating element is conformed to provide the outer layer of the steering wheel.

In one embodiment, the terminals are fastened/connected to the heating element with a conductive epoxy 62. Ultraviolet light or other equivalent method is used to cure the epoxy. The number and location of terminals may vary in order to limit the number of electrical connections for the assembled unit. Of particular note is that the terminals must make contact with the conductive layer. Therefore, if the terminals are applied after first layer 41 is formed a portion of either layer 39 or formable sheet 38 must be removed to allow the terminals to contact the conductive layer. Alternatively, a post may be drilled into either sheet 38 or layer 39 to make contact with the conductive layer. In yet another alternative, the terminals may be applied before, during or immediately after the application of the conductive layer on formable sheet 38 thereby negating the need to remove a portion of layer 39 or sheet 38.

The number and location of terminals may vary in order to limit the number of electrical connections for the assembled unit. The location of the terminals may vary for example; the terminals can be secured on either side of the preformed element. If however, the terminals are located on the outer surface of the preformed element they should be applied in a manner which provides a smooth continuous surface.

Each of the terminals has a conductor 64, which is secured, to a source of electrical power (e.g., bus bars 66 disposed about the periphery of the steering wheel core or directly to a clock spring coil disposed within the steering assembly). In addition, each of the terminals of the first half are capable of being secured to the terminals of the second half in order to provide a source of current to the preformed heating element comprising the first and second halves.

Of course, other means for attaching the terminals are contemplated for use in accordance with the present disclosure. For example, and in one embodiment the terminals are riveted to the element. This is particularly advantageous when the element has a flat shape or the point of connection for the terminal is located at a flat portion of the preformed element. Of course, the area where the riveting occurs does not have to include a flat shape.

Another method of securing the terminals would be a stapling method, which again would be particularly advantageous when the element has a flat shape or the point of connection for the terminal is located at a flat portion of the preformed element. Of course, the area where the stapling occurs does not have to include a flat shape.

In either the stapling or riveting method of securement of the terminals there would be a tail portion extending away from the end of the formable element that remains flat and is not part of the formed shape. The tail portion need not be flat and/or may comprise part of the formed shape as long as there is a sufficient amount of material for electrical connection to the terminals. After the formed portion is injected molded the termination would be completed and then the tail portion would be tucked under the area under the rigid formed element, which would be out of the way and would not interfere with the securement of the preformed element is its desired location.

It is also noted that while the terminals are shown as being secured to a particular surface of the preformed element, they may of course, be secured to an opposite surface as long as they are electrically connected to the conductive layer. In addition, it is also preferable that the terminals also have a small profile (e.g. flat).

The formed part (first layer 41) with the terminals secured thereto is then inserted into an injection mold (not shown) to complete the preformed heating element by adhering a second layer to first layer 18. The injection mold comprises an upper mold half and a lower molding half each defining an appropriately configured cavity that will define the final shape of the preformed heating element. An appropriate resin (polycarbonate, ABS, or polycarbonate ABS blends) is injected from within the cavity through a conduit in either mold half or alternatively is pre-applied into the cavity prior or after the insertion of the cut part (first layer 41) into the cavity. The resin will comprise a second layer that is adhered to the first layer by an injection molding process. When the resin is applied to the formable film directly this is sometimes referred to as back molding.

As taught in U.S. Pat. No. 6,740,856 and in alternative exemplary embodiments, it should be appreciated that the resin may be applied to layer 39 or even replace layer 39.

Once the injection process is complete the part is then ejected from the mold. The resin of the second layer may also provide a means for holding the terminals in their place as well as providing a smooth layer and structural characteristics to the preformed heating element. In addition, the cavity of the injection molding process can provide either the exterior or the interior of the preformed heating element. For example, by positioning the first layer at the top or the bottom of the injection molding cavity the injection molding process can be used to provide either the interior surface of the preformed heating element or the exterior of the preformed heating element.

Accordingly, the resin and injection molding process is completed using known technologies. Thus, the conductive layer is now encapsulated between a layer of resin and the material of the formable sheet. This process adds a second layer to the preformed heating element of the present disclosure.

Since each element of first layer 41 comprises a material that is formable and flexible by the vacuum forming process, first layer 41 is still flexible thus the second layer when cured is adhered to first layer 41 and increases the structural qualities of the preformed heating element.

Once the injection process is complete the part is then ejected from the mold. The resin of the second layer may also provide a means for holding the terminals in their place as well as providing a smooth outer layer and structural characteristics to the preformed heating element. Thus, the cavity of the injection molding process can provide either the exterior or the interior of the preformed heating element. For example, by positioning the first layer at the top or the bottom of the injection molding cavity allows the injection molding process to provide either the interior surface of the preformed heating element or the exterior of the preformed heating element.

Thus, the first layer comprising the formable film, the conductive layer and layer 39 is injection molded with an appropriate resin providing a rigid preformed heating element which can be used in numerous applications.

The curable medium for the injection molding process may comprise a resin, preferably one selected from the group consisting of thermosetting resins, elastomeric resins, thermoplastic resins, and combinations comprising at least one of the foregoing. Suitable thermosetting resins for use herein include alkyds, diallyl phthalates, epoxies, melamines, phenolics, polyesters, urethanes, rigid silicones, and the like. Suitable elastomeric resins include acrylates, butyls, chlorosulfonated polyethylene, fluorocarbons, fluorosilicones, polysulfides, polyurethanes, neoprenes, nitriles, silicones, styrene, butadienes, and the like. Suitable thermoplastic resins include acetates, acrylics, cellulosics, chlorinated polyethers, fluorocarbons, nylons (polyamides), polycarbonates, polyethylenes, polypropylenes, polyimides, polyphenylene oxides, polystyrenes, polysulfones, vinyls, and the like. In an exemplary embodiment, the preferred curable medium for the injection molding process is acrylics.

Further details of the application of the second layer through an injection molding process are found in United States Patent application entitled: "Preformed Heating Element and Method of Making", Ser. No. 10/360,589 issued as U.S. Pat. No. 6,740,856, filed contemporaneously with this application the contents of which are incorporated herein by reference thereto.

As an alternative, a conductor or thermistor can be molded directly into the part to eliminate a secondary procedure in a plant where the preformed part is applied in its desired location. This conductor or thermistor may be encapsulated during the adhering of the second layer to the first layer or it may be added before, during and immediately after the depositing of the conductive layer on the formable sheet. The thermistor is contemplated for use with a controller such as the controller described and disclosed in U.S. Pat. No. 6,172,342 the contents of which are incorporated herein by reference thereto. Of course, other equivalent means for providing a current to the heating element are considered to be within the scope of the present disclosure.

Accordingly, once the preformed heating element is formed the exterior provides a smooth continuous surface as well as providing a means for accommodating irregularities encountered in the area of application of the pre-molded heating element in addition to simplifying the process for manufacturing a heated item.

Figure 15:
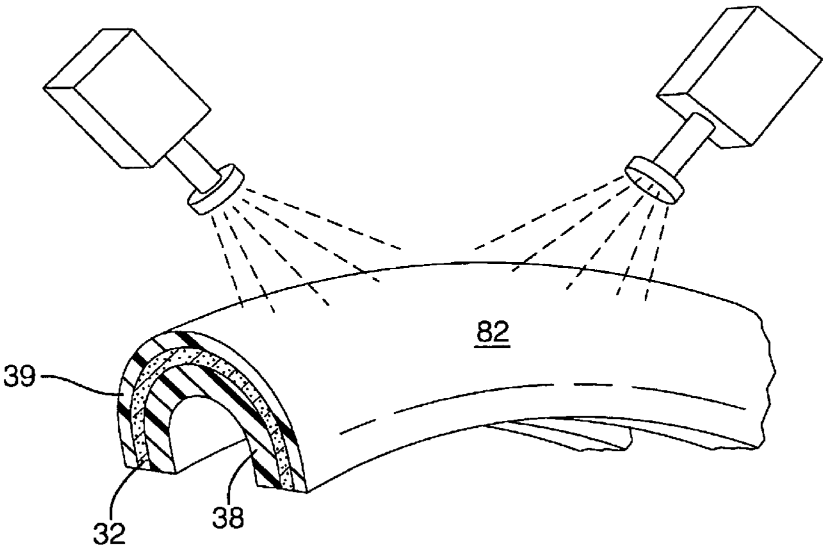
FIG. 15 is a perspective view of an application of an outer layer to the part formed from injection molding process illustrated in FIG. 14.

In addition to the process described above, and in accordance with an alternative embodiment of the present disclosure and referring now to FIG. 15, a third layer 82 is applied on top of either the second layer or the first layer of the preformed heating element to add a decorative outside appearance to the rigid plastic part. This is particularly useful if the preformed heating element is exposed in a location where it is desirable to have an aesthetically pleasing outer layer. The part can also be clear coated with yet another layer to protect the film from abrasion. In yet another alternative, the method of applying third layer 82 may be used for applying the decorative layer to the conductive layer of the first layer.

Figure 10:
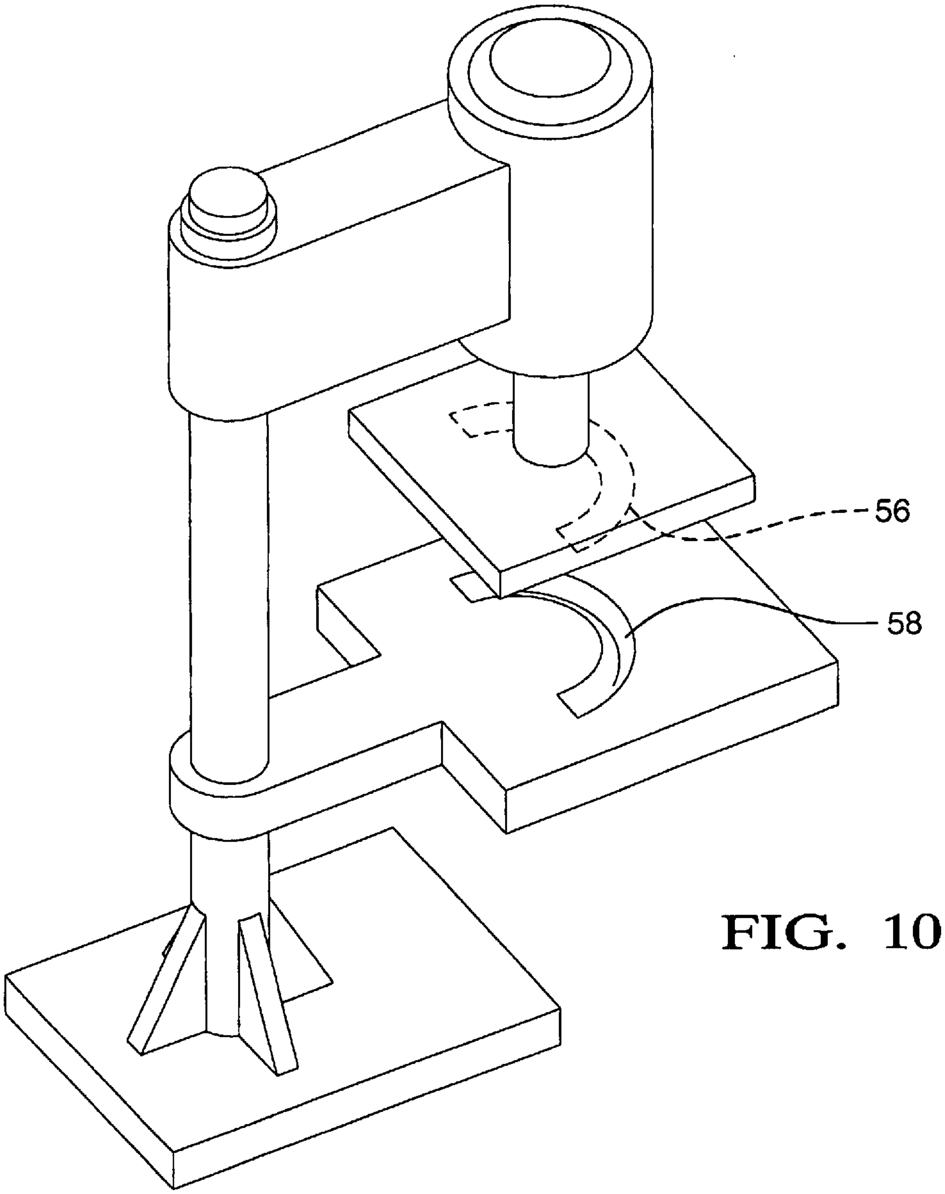
FIG. 10 is a perspective view of a machine used to stamp the formed part from the sheet illustrated in FIGS. 4 and 5.
Figure 12:
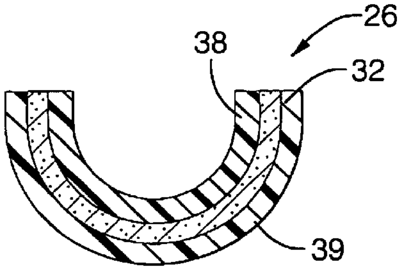
FIG. 12 is a view along lines 12—12 of FIG. 11.
Figure 11:
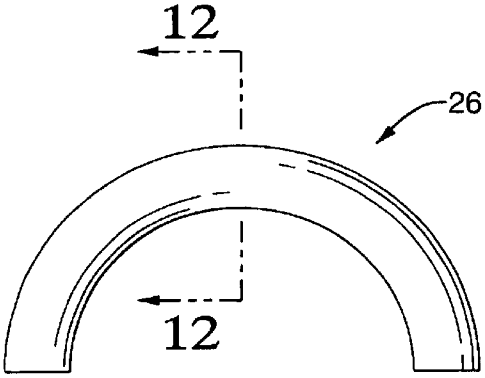
FIG. 11 is a top plan view of the formed part from the sheet illustrated in FIGS. 4 and 5.
Figure 13A:
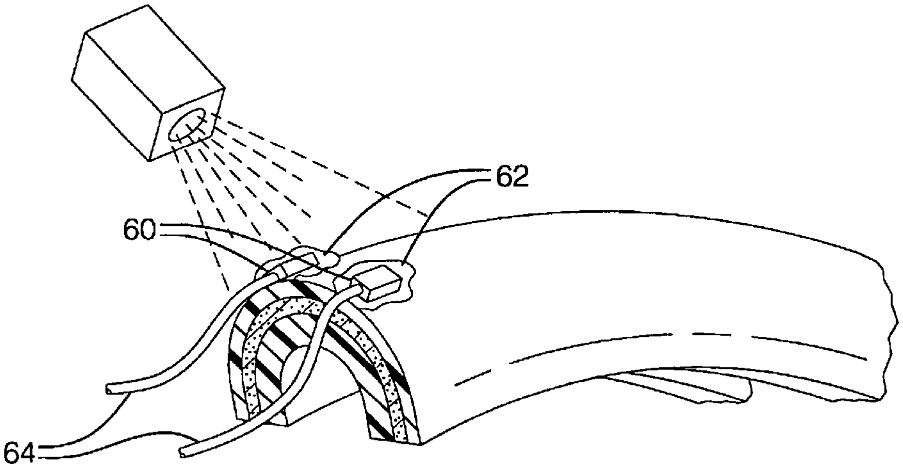
FIG. 13A is a perspective view of an application of terminals to the part formed from the sheet illustrated in FIGS. 4 and 5.
Figure 13B:
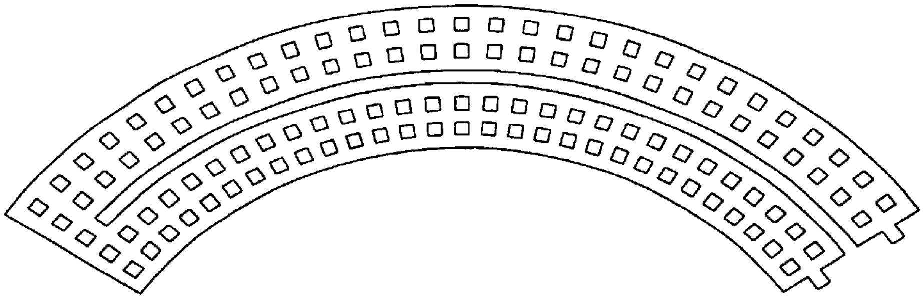
FIG. 13B is a perspective view of the first layer of a preformed heating element prior to vacuum forming and injection molding.
Figure 13C:
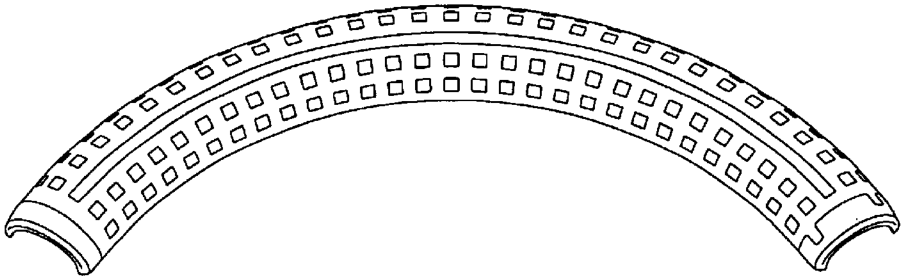
FIG. 13C is a perspective view of the first layer of a preformed heating element after vacuum forming and injection molding.

Referring now to FIGS. 10–12 and once the aforementioned forming step is complete the pre-formed part is cut and trimmed from the sheet by a cutting/trimming process wherein the preformed film part of the desired configuration is cut by a column guided punching tool 54 having a male 56 and female 58 die set allowing for the part to be stamped or cut from the sheet. Of course, equivalent means for removing the formed part from the sheet are considered to be within the scope of the present disclosure. Thus, the part (FIGS. 11 and 12) having an inner configuration resembling a portion of the outer configuration of the steering wheel is cut from the sheet. In addition, and if required the formed part can be trimmed or polished to remove any burrs or irregularities in the part.

Figure 14A:
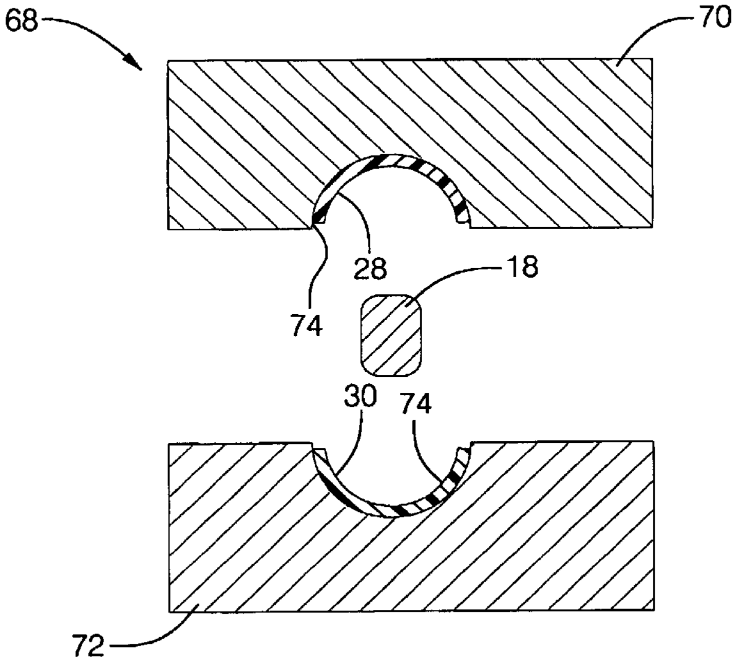
FIGS. 14A–B are cross-sectional views of an injection molding tool and process used to form the heated steering wheel of the present disclosure.
Figure 14B:
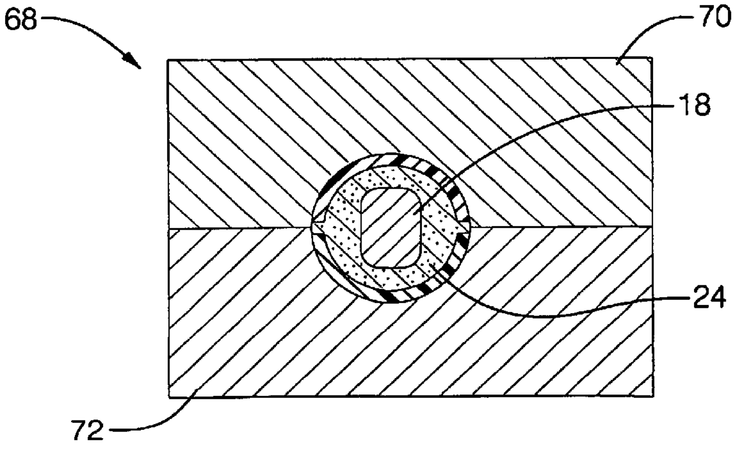
Figure 14C:
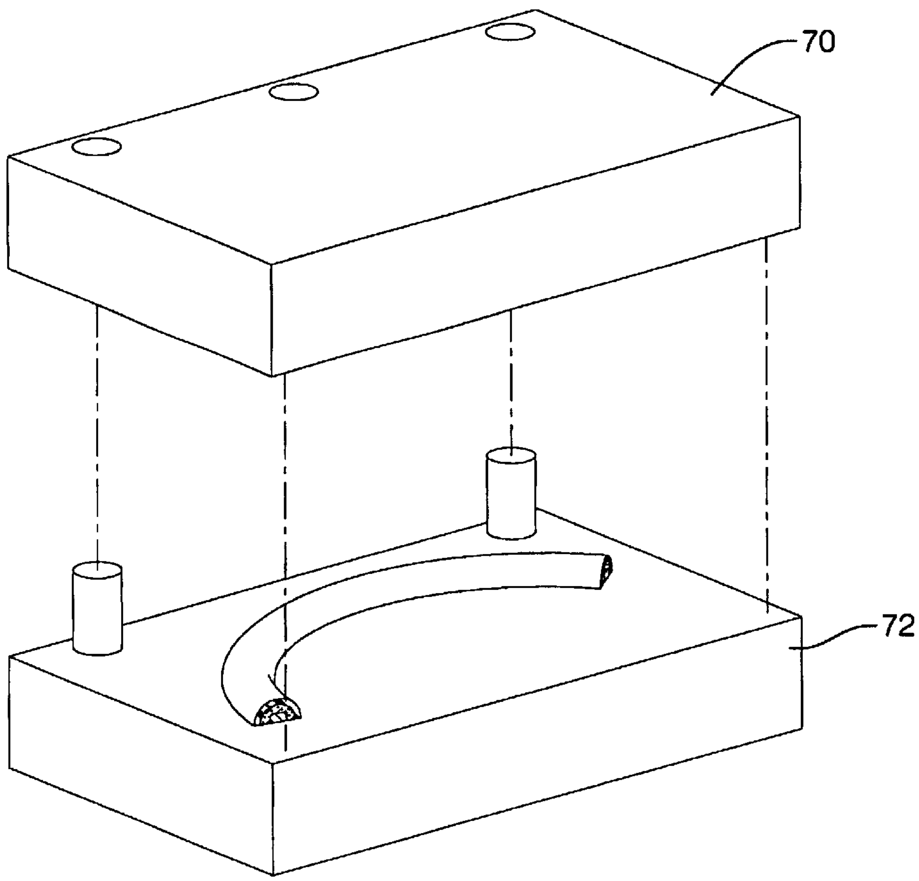
FIG. 14C is a perspective view of an injection molding tool and process used to form the preformed heating element of FIGS. 4–13.

Referring now to FIGS. 14A–B, the formed parts with the terminals secured thereto are then inserted into an injection mold 68 having an upper mold half 70 and a lower mold half 72 which define an appropriately configured cavity 74 when placed together. Once the preformed heating elements are inserted into the mold halves the conductors of the terminals are secured to the frame or rim via clips (not shown) or other means to secure the wires to the frame during the injection process of the cushion member. The wires are routed down through the spokes prior to the injection process so that an end is available for securement to a source of power. In addition, the wires are also embedded in the material used for the cushion member.

The preformed elements are held in place by being pressed into the cavity of the mold and once secured therein an appropriate amount of urethane is injected into the cavity through a conduit in accordance with known injection molding techniques. The urethane when cured fixedly secures the preformed heating elements in place. Of course, materials other than urethane providing the desired characteristics of cushion member 24 are capable of being injected into the mold and are considered to be within the scope of the present disclosure. Therefore, the preformed heating elements are pressed into the mold halves and the urethane of cushion member 24 is foamed in place around rim 18.

Accordingly, once the first and second halves are formed and inserted into mold 68 the outer surfaces of the first and second halves provides a smooth continuous surface as well as simplifying the process for manufacturing a heated steering wheel since the foam or equivalent material is formed behind the preformed heating elements and secures them in place. In order to provide additional heated areas, a plurality of halves are inserted into the mold to provide a smooth continuous surface of all or a portion of the steering wheel. Thus, the preformed heating elements provide a means for heating and covering the entire exterior surface or particular portions of the steering wheel.

In an exemplary embodiment the preformed heating elements are partially covered with another outer decorative covering such as leather while the exterior or uncovered portion some of the preformed heating elements provide an exterior surface of the heated steering wheel while the decorative covering (e.g., leather or other applied material provides the rest). In this embodiment, the decorative layer applied to the preformed heating element is used to provide the exterior heated surface with aesthetically pleasing qualities while the leather or other applied material is heated by the preformed heating element disposed underneath.

Of course, may combinations of the preformed heating elements and applied exterior surface (e.g., leather or other materials) are contemplated in accordance with the present disclosure. For example, the preformed heating elements may provide the entire exterior heated surface (e.g., no leather applied) of the heated steering wheel. Alternatively, the entire exterior heated surface of the preformed heating element is covered by an exterior layer e.g., leather or other equivalent material. In yet another alternative, only a portion of the exterior surface is provided with a preformed heating element and the mold of the injection molding process provides the rest of the exterior surface, which may or may not be covered by another exterior layer such as leather.

Thus, any combination of preformed heating elements and applied exterior surfaces or lack thereof is contemplated in accordance with the present invention.

For example and as described above, the preformed heating elements are used to provide heated areas in discrete locations while the injection molding process of cushion member 24 provides the exterior surface in other areas.

Accordingly, and once formed in place, the preformed heating element or elements are capable of providing heat to a second layer disposed over the preformed heating element. As discussed, the second layer can provide the exterior surface of the heated steering wheel, which is gripped by the operator's hands, and may also provide a decorative appearance to the heating steering wheel. It should be appreciated that the second layer may be made from a combination of materials to achieve the desired decorative appearance. For example, a portion of second layer covering outer rim 20 and spoke 22 may be a material such as leather, while a portion of the second layer covering the inner rim may be a material such as plastic.

In an exemplary embodiment two preformed heating elements are each inserted into a corresponding area of the steering wheel mold halves (70, 72) and the frame portion 18 is positioned in either mold half or is fixedly secured such that the upper and lower portions of the steering mold are closed about the frame portion such that the two portions of the preformed heating elements are disposed about the frame portion in a facing spaced relationship such that cushion member 24 or more particularly the material comprising cushion member 24 can be injection molded about frame portion 18 while the two portions of the preformed heating element are ultimately positioned about the exterior of the cushion member. Of course, the number size and configuration of the preformed heating elements inserted in the mold halves may vary.

Figure 14D:
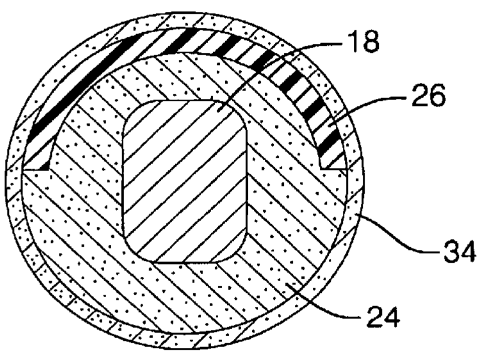
FIG. 14D is a cross sectional view of an alternative embodiment of the present disclosure.

For example, multiple pairs of heating elements are capable of being located about the heated steering wheel or only an upper portion of the steering wheel (FIG. 14D) is provided with a preformed heating element.

Therefore, and as will be discussed herein a heated steering wheel is formed wherein preformed heating elements are each inserted into a mold half and are spatially disposed about the frame such that the material of cushion member 24 is inserted therebetween. Thus, and when this molding process is complete the preformed heating element completely or substantially covers the outer periphery of a pre-determined radial portion or arc of cushion member disposed about the frame. In addition, and in accordance with the desired location, length or radius of the area requiring heating, multiple preformed heating elements are positioned in discrete areas of the mold halves. For example, the entire rim may be covered with preformed heating elements or only a specific location. As yet another alternative only one half of the steering wheel is covered with preformed heating elements.

Figure 14E:
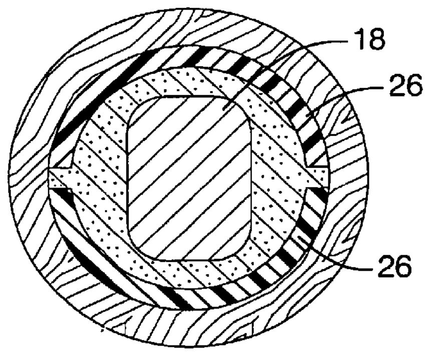
FIG. 14E is a cross sectional view of an alternative embodiment of the present disclosure.
Figure 16:
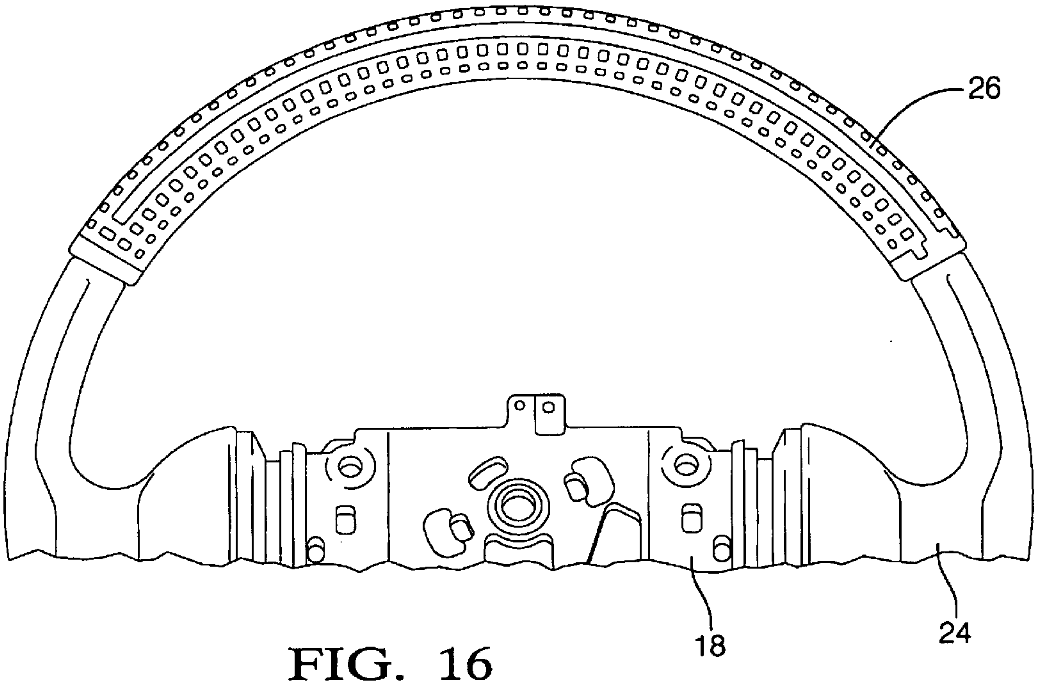
FIG. 16 is a top plan view of a portion of a steering wheel formed by an embodiment of the present disclosure.

Once the steering wheel is molded or formed in accordance with the present disclosure the preformed heating element 26 is located over the materials injected in the mold halves to form cushion member 24. As illustrated in FIG. 16 preformed heating element 26 provides a portion of the exterior surface in some areas while cushion member 24 provides the exterior surface in other areas. Moreover, the outer periphery or portion thereof is defined by the preformed heating elements inserted into the mold halves and it provides heat to an outer wrap 34 (FIG. 14D) surrounding heating element 26 or a wood appliqué (FIG. 14E) which may be pre-applied to heating element 26 or alternatively comprises a separate element. Outer wrap 34 provides the exterior surface of heated steering wheel 10, which is gripped by operator's hands 16. Thus, and depending on the outer layer of the steering wheel (e.g., leather) the preformed heating elements are secured to the frame via the cushion member as it is injection molded into the mold halves.

In the embodiment where an outer wrap is applied and layer 39 does not provide the outer surface, the outer wrap covers preformed heating element 26 to provide a decorative appearance to heating steering wheel 10. It should be appreciated that outer wrap 34 may be made from a combination of materials to achieve the desired decorative appearance. For example, a portion of outer wrap 34 may be a material such as leather, while a portion of the outer wrap 34 covering the preformed heating element may be a material such as plastic.

Therefore the use of the preformed heating elements in the injection molding process eliminates the undesireable affects of the irregularities and protrusions associated with heating elements that do not provide a uniform surface on the steering wheel or steering wheel insert to which the outer wrap is applied, and which can be seen through the decorative covering such as leather. In order to provide for a smooth surface, and an aesthetically pleasing and smooth outer appearance of the steering wheel, the preformed heating element is utilized. It should be appreciated that the preformed heating element may be applied to a variety of wheel designs such as leather-wrapped design, or a two-shot, molded polyurethane design. It is also suitable for two-, three-, and four-spoke designs.

The preformed heating element provides for ease of assembly of the heated steering wheel during the manufacturing process. Instead of separately applying a heating element on the steering wheel after the cushion forming process with adhesive or other means, the preformed heating element is inserted into the mold and injection of the foam material of cushion layer 24 in the mold secures the heating elements about the cushion member without any additional steps. Thus, the assembly of the heated steering wheel is less labor intensive. Also, the preformed heating element can be fully tested prior to assembly and production of the final steering wheel.

Since the preformed heating elements are inserted into the mold halves during the injection of the cushion layer between the frame and the inner surface of the preformed heating elements the assembly method accommodates the parting line of the steering wheel insert as well as any parting line which would have been created by molding process of the cushion layer. In addition, the preformed heating element provides a more uniform distance of the heating element away from the outside of the wheel, allowing for even distribution of the heat throughout the wheel. In particular, the exterior portions are capable of being heated without having to worry about unsightly show through of the heating element.

Once assembled, the preformed heating element operates through a controller connected to an electrical power supply. One example of such a controller is illustrated in U.S. Pat. No. 6,172,342, filed on Sep. 15, 1999, the contents of which are incorporated herein by reference thereto. Of course, other equivalent means for providing a current to the heating element are considered to be within the scope of the present disclosure.

The entire steering wheel may be heated, but there are also positions on the steering wheel more prone to be in contact with the drivers hands at any one point in time, especially when the vehicle is first placed into operation. These positions include those commonly referred to as the 10 and 2 positions, so named to correspond to the location of those same numbers on a clock face.

A non-uniform heat load may be applied to these, or other discrete positions on the steering wheel such that the resistivity local to those positions is varied by varying the thickness of the conductive layer to form localized higher heating zones. These higher heating zones result from the increased power dissipated from the thinner areas as compared to the thicker areas, both of which are simultaneously provided with the same amount of current.

Advantageously, the preformed heating element and application thereof provides for the elimination of irregularities and protrusions, collectively referred to as imperfections, associated with conventional heating elements as well as injection molding techniques. Such imperfections include pock-marks, bubbles, processing marks and artifacts, and the so-called parting line, which is an artifact of the molding process by which the steering wheel substrate was formed. The presence of such imperfections within the steering wheel substrate provides a point source where excessive wearing of the heating element can occur during normal use. Also, imperfections can be seen through exterior (e.g., leather) coverings resulting in a non-aesthetically pleasing assembly.

The preformed heating elements and application thereof provides for easy assembly of the heated steering wheel. Instead of applying a heating element directly on the steering wheel with adhesive or other means, the heating elements deposited in the molds prior to the injection molding process allows for a quick, accurate, and less damaging assembly on the heated steering wheel. Thus, the assembly of the heated steering wheel of the present disclosure is less labor intensive. Also, the preformed heating element can be fully tested prior to assembly and production of the final steering wheel assembly.

Figure 17:
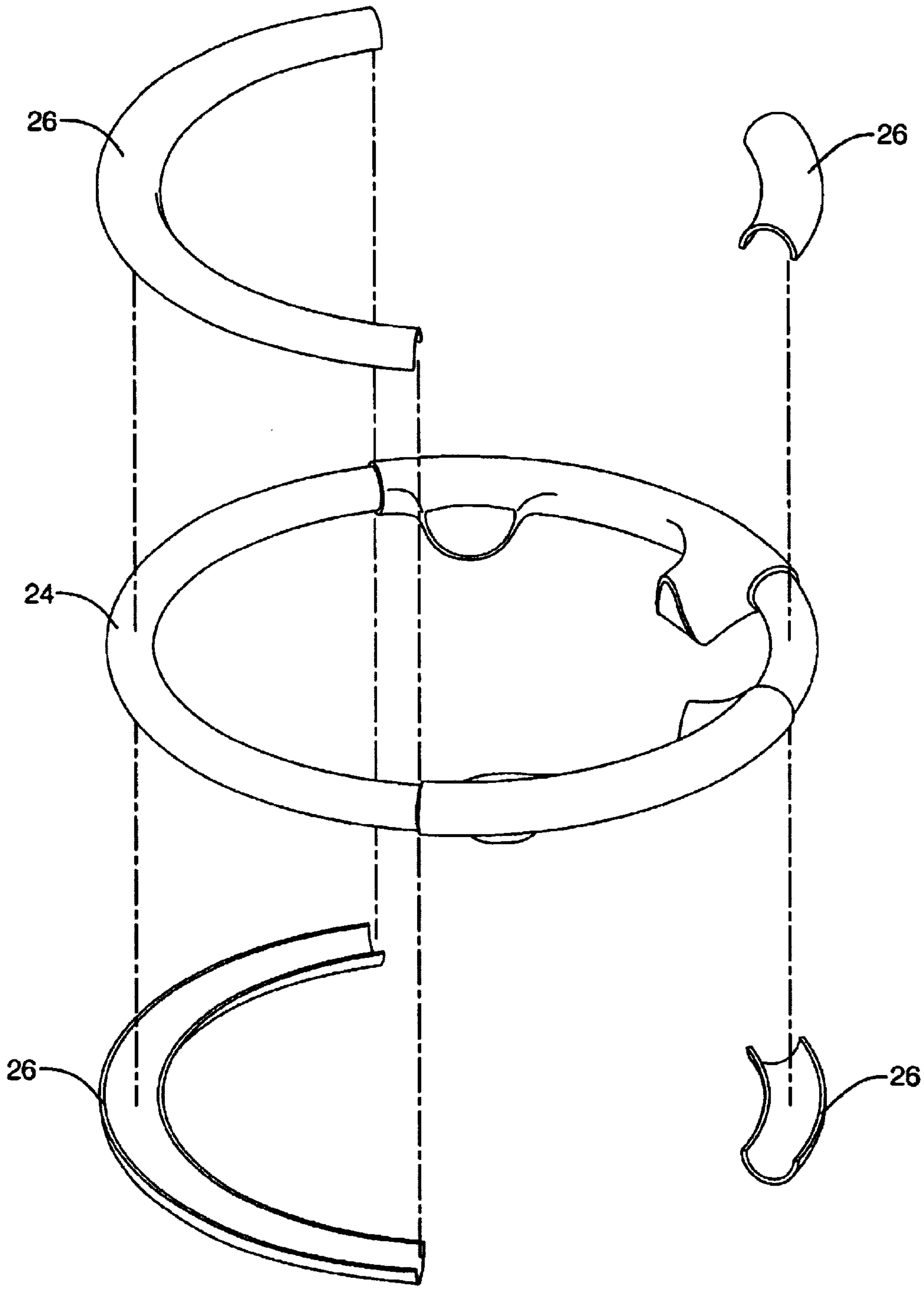
FIG. 17 is an exploded view of an alternative embodiment of the present disclosure.

In an alternative embodiment and as illustrated in FIG. 17 the pre-formed heating elements 26 are not placed in the mold halves and they are applied after the forming of the cushion member 24 on frame portion 18, the pre-formed heating elements are applied by an adhesive disposed on an inner surface of the preformed element. FIG. 17 also illustrates possible configurations of the preformed heating elements. In yet another alternative wherein frame portion 18 and cushion member 24 are one in the same and are formed from a material capable of providing a sufficient rigidity and strength as well as cushioning (e.g., a single or two shot injection molded frame) preformed heating element 26 is also applied by adhesive process.

As an alternative and referring now to FIG. 15, and for use in any of the aforementioned methods, the preformed heating elements have a second ink layer 82 applied on top of the cured resin of the preformed heating element. The second ink layer adds a decorative outside appearance to the rigid plastic part. The part can be also clear coated with another layer to protect the film from abrasion. These preformed shells can then be used as originals or replacements for real wood or provide any other decorative look as they will be ready for installation with their outer aesthetic appearances already applied. The shells can also be inserted into the backside of a real wood appliqué if required.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A heated steering wheel with a preformed heating member, comprising:

an rim portion;

a cushion layer disposed about said rim portion;

a preformed heating element disposed about said cushion layer;

wherein said cushion layer is applied using a molding process and said preformed heating element and said rim portion are inserted in a mold used for the molding process prior to the application of said cushion layer therein, wherein said preformed heating element, comprises:

a first layer, comprising a formable film having a conductive layer deposited on one surface of the formable film, said conductive layer being adapted for receiving an electrical current and providing a source of heat; and an outer layer disposed over said conductive layer, said outer layer providing a smooth surface and/or a decorative covering; and a second layer adhered to another surface of the formable film, said second layer providing rigidity to the preformed heating member.

2. The heated steering wheel as in claim 1, wherein said first layer is formed with by the following manufacturing methods: inking and vacuum forming and said second layer is adhered with resin impregnating or injection molding.

3. The heated steering wheel as in claim 1, wherein said second layer is a curable medium, comprising a polymeric resin selected from the group consisting of thermosetting resins, elastomeric resins, thermoplastic resins, and combinations comprising at least one of the foregoing.

4. The heated steering wheel as in claim 1, wherein said sheet of formable film is a polycarbonate/polyester blended film.

5. The heated steering wheel as in claim 2, wherein the inking is used to apply said conductive layer on said formable sheet and the resin impregnating or injection molding is used to adhere the second layer to the formable film.

6. The heated steering wheel as in claim 5, wherein said second layer is a curable medium, comprising a polymeric resin selected from the group consisting of thermosetting resins, elastomeric resins, thermoplastic resins, and combinations comprising at least one of the foregoing.

7. The heated steering wheel as in claim 6, wherein said sheet of formable film is a polycarbonate/polyester blended film.

8. A heated steering wheel with a preformed heating member, comprising:

a rim portion;

a cushion layer disposed about said rim portion;

a preformed heating element disposed about said cushion layer, wherein said preformed heating member comprises:

a first layer of vacuum formable items comprising a sheet of formable film and a conductive layer for receiving an electrical current and providing a source of heat, said conductive layer being disposed on said sheet of formable film, said first layer being formed into a desired shape by a forming process, wherein said first layer remains non-rigid after said forming process; and a second layer disposed on said first layer after said forming process, said second layer provides rigidity to the first layer; and wherein said cushion layer is applied using a molding process and said preformed heating element and said rim portion are inserted in a mold used for the molding process prior to the application of said cushion layer therein.

9. The heated steering wheel as in claim 8, wherein said first layer is formed by a vacuum forming process and said second layer comprises a layer of resin and said conductive layer is encapsulated between said layer of resin and the material of the formable sheet.

10. The heated steering wheel as in claim 9, wherein said second layer provides either an exterior or an interior surface of said preformed heating element.

11. The heated steering wheel as in claim 9, wherein a pair of terminals are applied to said conductive layer before application of said second layer and said second layer holds said terminals in place.

12. The heated steering wheel as in claim 8, further comprising a decorative outer layer applied to said preformed heating element.

13. The heated steering wheel as in claim 12, wherein said decorative outer layer is a leather wrap.

* * * * *